Dec. 13, 1966 D. NEILSON 3,292,155
COMPUTER BRANCH COMMAND
Filed March 15, 1963
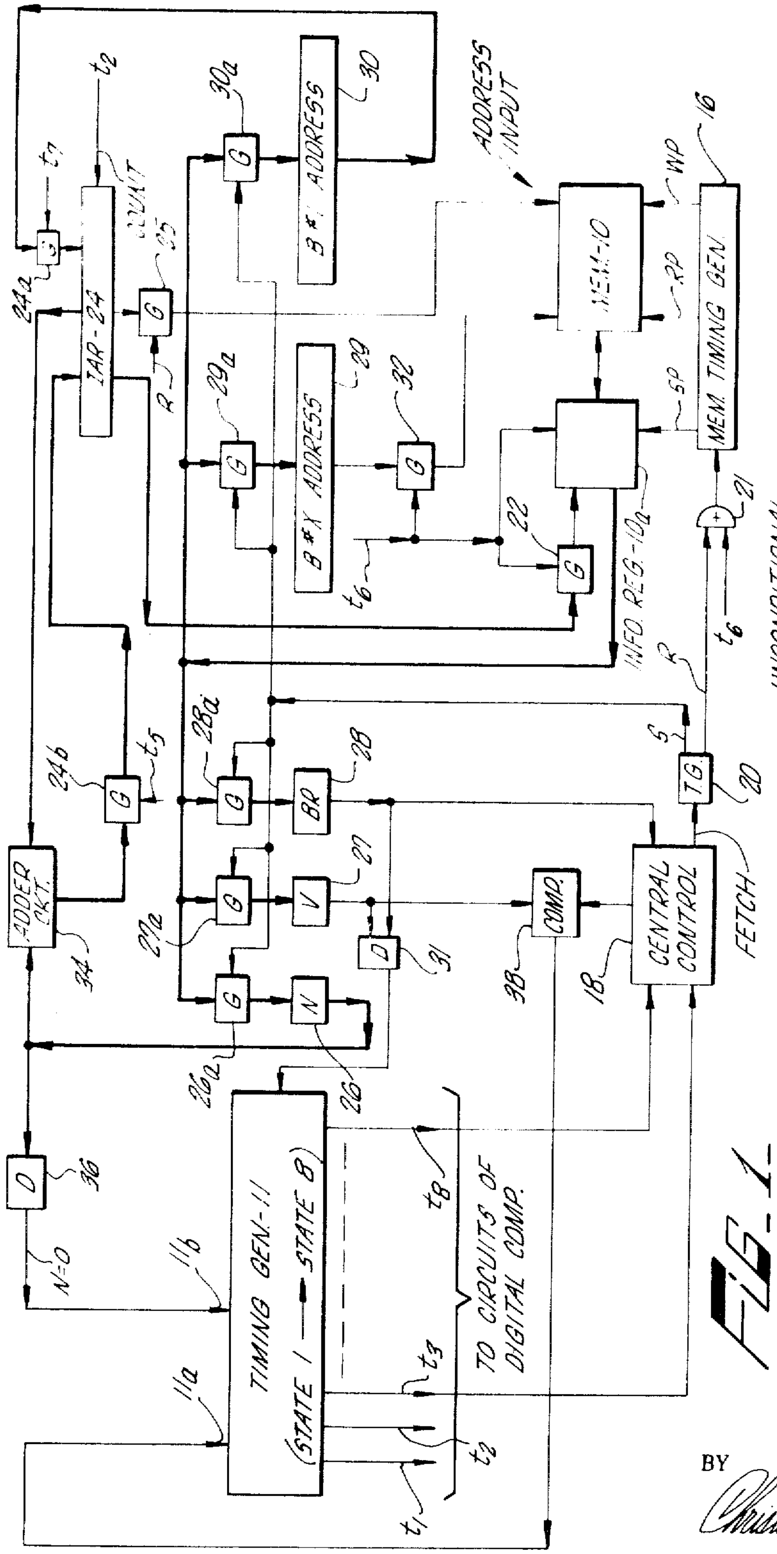
FIG. 1
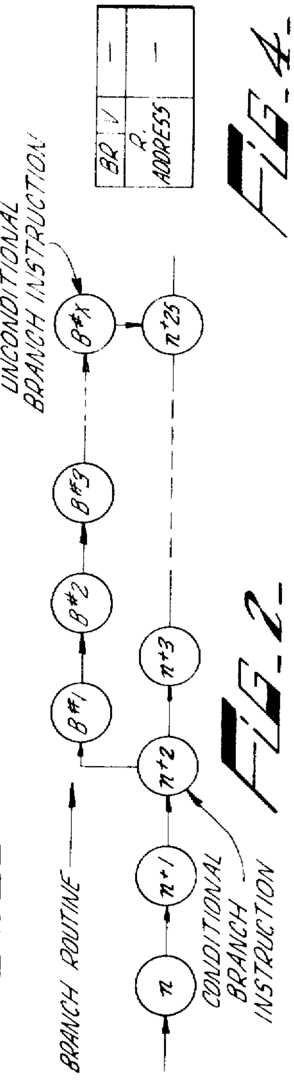
FIG. 2
| BR | V | N |
|---|---|---|
| B#1 ADDRESS | | B#X ADDRESS |
FIG. 3
| BR | V | — |
|---|---|---|
| R. ADDRESS | | — |
FIG. 4
INVENTOR.
DAN NEILSON
BY
Christie, Parker & Hale
ATTORNEYS.

United States Patent Office 3,292,155
Patented Dec. 13, 1966

3,292,155
COMPUTER BRANCH COMMAND
Dan Neilson, Lake Park, Fla., assignor to Burroughs Corporation, Detroit, Mich., a corporation of Michigan
Filed Mar. 15, 1963, Ser. No. 265,375
12 Claims. (Cl. 340—172.5)

This invention relates to digital computers and more particularly to improvements in apparatus in stored program digital computers for branching from the main program into a branch routine and forming an instruction for returning from the branch routine to the main program.

Stored program digital computers are known wherein a memory is provided for storing a program and an instruction counter is provided for forming the addresses of sequentially addressable locations in the memory from which program instructions are fetched for execution. Branch instructions are commonly placed in the program which specify that upon the occurrence of a particular condition, the computer is to branch from the main program into a branch routine.

Digital computers are also known wherein the address of the next instruction following the branch instruction is stored into a predetermined location of the memory. The address stored in the predetermined location is read from the memory subsequent to the execution of the branch routine and stored into the instruction counter thereby allowing the computer to return to the next instruction in sequence after the branch instruction.

The present invention contains an improvement in stored program digital computers and improvements in methods for branching to a branch routine and forming an instruction for return to the main program. The improvement in digital computers allows a branch to a branch routine and return from such branch routine to a desired instruction in the main program, not necessarily limited to the next instruction following the branch instruction. To this end, a branch instruction is provided having a modifier for designating the amount by which the address of the branch instruction is to be modified to form the address of the instruction to which the digital computer is to return after the execution of the branch routine. An address formed by combining the branch instruction address and a modifier is stored in an unconditional branch command located at the end of the branch routine. Thus, after each of the instructions of the branch routine are executed, the unconditional branch instruction of the branch routine is executed causing the computer to use the address therein to return to the designated instruction in the main program.

Such an arrangement is important in computer programming. For example, it simplifies the programming for trace routines for checking out programs for the digital computer. Trace routines are used for checking out the program steps while keeping track of the corresponding state of the instruction counter.

Briefly, the apparatus of a specific embodiment of the present invention in a digital computer is arranged for forming an address for use in a return from branch routine instruction wherein program instructions are arranged in order and stored in sequentially addressable memory locations of a memory unit and includes a branch instruction having a modifier portion and an address corresponding to the return from branch routine instruction, comprising means for forming addresses identifying instructions of a stored program in a memory unit including a branch instruction, means for reading the instruction designed by the addresses out of such memory unit, means for combining one of the instruction addresses with the modifier portion of a branch instruction read out of such memory unit for forming the address of an instruction for execution following the execution of such branch instruction, and means for writing the address formed in the last step into the return from branch routine instruction identified by such branch instruction for forming a complete return from branch routine instruction for control of the digital computer.

Briefly, the method of a specific example of the present invention lies in a method in a digital computer of forming a return from branch instruction for a computer program arranged and stored in sequentially addressable memory locations of a memory unit including the steps of: forming the addresses identifying sequentially addressable memory locations of a memory unit containing instructions including a branch instruction having at least a modifier portion, and an address identifying a return from branch routine instruction; reading the instruction corresponding to the formed addresses out of such memory unit; combining the modifier portion of a branch instruction read out of such memory unit with one of the formed instruction addresses to form an address identifying an instruction to be executed following the branch routine; and writing the instruction address formed in the last step into the return from branch routine instruction identified by the branch instruction read out of such memory unit.

These and other aspects of the present invention may be more fully understood with reference to the following discussion of the figures of which—

FIG. 1 is a block diagram of a stored program digital computer and embodying the present invention;

FIG. 2 is a flow diagram illustrating the sequence for execution of instructions in a digital computer including a conditional branch instruction and the instructions of a branch routine;

FIG. 3 is a sketch illustrating the word structure of a conditional branch instruction for use in the stored program digital computer shown in FIG. 1; and FIG. 4 is a sketch illustrating the word structure of an unconditional branch instruction for use in the stored program digital computer shown in FIG. 1.

Refer now to the stored program digital computer system shown in the block diagram of FIG. 1 which embodies the present invention. A memory unit 10 is provided for storing a computer program and information to be processed by the computer. The program includes conditional branch instructions and unconditional branch instructions. The conditional branch instructions are used for causing the computer to branch from a main series of program instructions into a branch routine provided certain conditions have occurred prior to the execution of the conditional branch instruction. An unconditional branch instruction is placed at the end of a branch routine for causing the computer to unconditionally branch back to a predetermined instruction in the main series of instructions.

Refer now to FIG. 3 which shows a sketch of the word structure of a conditional branch instruction. The portion of the conditional branch instruction referenced by the symbol BR is the operator portion of the conditional branch instruction which designates that it is a branch instruction. The portion of the instruction referenced by the symbol V is a variant which designates whether the instruction is a conditional or unconditional branch instruction, and, if a conditional branch instruction, what condition the digital computer is to branch on. The portion of the instruction referenced by the symbol N is a modifier designating the amount by which the branch instruction address is to be modified to form the address of the instruction which is to be executed following the branch routine. To be explained in detail, the modified address is stored in the unconditional branch instruction located at the end of the corresponding branch routine.

The portion of the instruction referenced by the symbol B#1 ADDRESS is the address of the first branch instruction in the branch routine which is to be executed. The portion of the instruction referenced by the symbol B#X ADDRESS is the address of the unconditional branch instruction located at the end of the corresponding branch routine.

Refer now to FIG. 4 which shows the structure of the unconditional branch instructions. Similar to a conditional branch instruction, an unconditional branch instruction contains a portion referenced by the symbol BR which is the operator portion and designates that it is a branch instruction. The portion of the instruction referenced by the symbol V, as pointed out hereinabove, designates that it is an unconditional branch instruction. The portion of the instruction referenced by the symbol R. ADDRESS is the address of the instruction to which the computer is to branch upon executing that particular instruction. This portion of the instruction is the portion of the instruction where the modified address, formed by combining the variant of the conditional branch instruction with the branch instruction address, is stored. Thus, it will be noted that upon execution of an unconditional branch instruction the digital computer will either branch to the instruction originally specified by the programmer by means of the R. ADDRESS originally placed in the instruction by the programmer or branch to the instruction specified by a modified instruction address, depending on whether a modified instruction address is stored in the unconditional branch instruction.

A timing generator 11 is provided for forming timing pulses for sequencing the computer circuits shown in FIG. 1 only during the execution of a conditional branch instruction. The timing pulses are formed automatically and completely independently of any program instructions subsequent to the initial branch instruction. The timing generator 11 is a conventional timing generator with a clock pulse generator (not shown) and flip-flops with gating (not shown) for forming electrical timing pulses at the outputs *t*1 through *t*8 in one of the following sequences: *t*1, *t*2, *t*3 or *t*1, *t*4, *t*5, *t*6, *t*7, *t*8 or *t*1, *t*4, *t*7, *t*8. The timing generator 11 is responsive to the application of a control signal by the decoder 31 for commencing the information of timing pulses in one of the aforementioned sequences. The sequence with which the timing generator 11 forms control pulses depends on the control signals applied at its input circuits 11*a* and 11*b*. Table I illustrates the possible combinations of signals at the input circuits 11*a* and 11*b* and the corresponding sequence with which timing pulses are formed at the output circuit.

*Table I*

| (11*a*) Compare | (11*b*) N=0 | Sequence of Timing Signals |
|---|---|---|
| — | — or X | t1, t2, t3 |
| X | — | t1, t4, t5, t6, t7, t8 |
| X | X | t1, t4, t7, t8 |

A symbol X represents an input control signal whereas a symbol — represents the absence of an input control signal.

To be explained in detail, a control signal is applied at the input circuit 11*a* by the decoder 31 whenever a conditional branch instruction is executed and upon comparison it is determined that the condition upon which branching is to occur has already happened in the digital computer. Also, a control signal is applied at the input circuit 11*b* by a decoder 36 if the modifier of the branch command is equal to zero. Referring to Table I, if there is a failure of comparison (no control signal applied at the input circuit 11*a*) regardless of whether the modifier is or is not equal to zero, the timing generator forms control pulses at the following output circuits in the indicated order: *t*1, *t*2, *t*3. Once a control pulse is applied at either of the output circuits *t*3 or *t*8 no more pulses are formed until a new branch command is read out of the memory 10.

The memory unit 10 is a coincident current magnetic core memory unit including an address decoder, core current drivers, sense amplifiers, etc. (not shown) for reading, writing and storing the digital information described hereinabove. A memory timing generator 16 is provided along with the memory unit 10 and an information or buffer register 10*a* is provided for forming a conventional memory system of the type described in chapter 7 of the book entitled "Digital Computer Fundamentals," written by Thomas C. Bartee and published by the McGraw-Hill Book Company, Inc. of New York in 1960. The memory timing unit 16 is responsive to the application of a control signal by the gate 21 for applying a read pulse followed by a write pulse to the memory unit 10. The memory timing generator 16 also applies a strobe pulse to the buffer register 10*a* in coincidence with the read pulse. The memory unit 10 is responsive to the read pulse for reading out the instruction in the addressed location and the strobe pulse causes the information register 10*a* to store the instruction. Such an arrangement including timing is described in the above referenced book entitled "Digital Computer Fundamentals."

The information register 10*a* has an additional feature over conventional buffer registers in that it is responsive to a control signal applied at the *t*6 output circuit of the timing generator 11 for inhibiting the storage of the R. ADDRESS portion of an unconditional branch instruction read from the memory unit 10. To be explained in detail in the subsequent discussion, a gating circuit 22 stores an instruction address contained in an instruction address register 24 into the portion of the unconditional branch instruction for the R. ADDRESS in response to a control signal applied at the *t*6 output circuit. Thus, when the memory unit 10 reads an unconditional branch instruction for storage in the buffer register 10*a*, the address contained in the command address register 24 is stored into the R. ADDRESS section thereof and the following write pulse from the memory timing generator 16 causes the memory unit 10 to write the unconditional branch instruction back in the same address from which it was read but now with the previously formed return address contained therein.

It should be noted that the conventional buffer register shown in FIGS. 7–9 of the book entitled "Digital Computer Fundamentals" may be modified using conventional gating techniques in order to inhibit the storage of part of a word read out of the memory 10. For example, an "and" gate may be connected to the "one" input of each flip-flop which normally stores the part of the word to be inhibited. The "and" gate then would have one input connected to the corresponding sense amplifier and another input connected through an inverter circuit to the *t*6 output circuit. In this manner, such flip-flops would not receive a trigger signal from the corresponding sense amplifier during the pulse at the output circuit *t*6.

It should also be noted that the flip-flops of the buffer register 10*a* are reset after every memory cycle and before the following timing pulse by gating (not shown) as described in the above referenced book entitled "Digital Computer Fundamentals."

Refer now to the instruction address register 24. The instruction address register 24 is a conventional flip-flop register including gating (not shown) for storage of an instruction address and for counting the address contained therein up one address for each pulse applied thereto by the *t*3 output circuit of the timing generator 11.

A gating circuit 25 is provided for gating the instruction address contained in the instruction address register 24 to the input address lines for the address decoder and core drivers (not shown) of the memory unit 10. The gating circuit 25 operates in response to a read signal formed by a timing generator 20.

An instruction storage means, including conventional flip-flop registers 26, 27, 28, 29 and 30, is provided for storing instructions read out of the memory unit 10 and stored in the information register 10*a*. Conditional branch instructions are executed while stored in registers 26 through 30. Gating circuits 26*a*, 27*a*, 28*a*, 29*a* and 30*a* store various parts of an instruction into the correspondingly numbered register in response to a store signal formed by the timing generator 20.

In the case of a conditional branch instruction, the gating circuit 26*a* stores the modifier portion (N) into the register 26; the gating circuit 27*a* stores the variant portion (V) into the register 27; the gating circuit 28*a* stores the operator portion (BR) into the register 28; the gating circuit 29*a* stores the B#X ADDRESS into the register 29; the gating circuit 3*a* stores a B#1 ADDRESS into the register 30.

A gating circuit 24*a* is provided for storing the address contained in the address register 30 into the command register 24 in response to a control pulse applied at the *t*7 output circuit.

A gating circuit 32 is provided for applying an instruction address contained in the register 29 to the address decoder and core drivers (not shown) of the memory unit 10 in response to a control pulse applied at the output circuit *t*6.

An adder circuit 28 is provided for combining the modifier portion of an instruction contained in the register 26 with the instruction address contained in the instruction address register 24. The adder circuit 28 is a conventional parallel binary adder of the type described beginning at page 158 of the above-referenced book entitled "Digital Computer Fundamentals." A gating circuit 24*b* stores the output signal of the adder circuit 34 into the instruction address register 24 in response to a control signal applied at the output circuit *t*5. The adding circuit 34 and gating circuit 24*b* form a means for combining an instruction address and a modifier and for forming a return address automatically in response to timing pulses from generator 11 and independently of programming.

A decoder circuit 36 is provided and is a conventional decoder for continuously applying a control signal at the 11*b* input circuit of the timing generator 11 whenever the modifier portion of an instruction stored in the register 26 represents a digit zero.

A decoder circuit 31 forms a control signal at the output circuit thereof whenever a conditional branch instruction is stored in the instruction storage means. It will be noted from the aforementioned description that a conditional branch instruction is stored in the instruction storing means whenever the operator portion (stored in register 28) specifies a branch and the variant portion (stored in register 27) specifies that the branch is conditional.

A central control unit 18 is provided and is typical of the type normally used in digital computers and includes circuits (not shown) for forming signals corresponding to different conditions occurring during the execution of instructions. These conditions include the conditions specified by the variant in a conditional branch instruction upon which the digital computer is to branch. Conditions upon which the variant portion of a conditional branch instruction will cause the computer to branch include:

No operation
Unconditional branch
A word of information is zero or low
A word of information is zero
A word of information is greater than zero
A word of information is not equal to zero
A word of information is less than or equal to zero
A word of information is equal to or greater than zero
A carryout occurred from an arithmetic operation
A halt condition is sensed A conditional branch instruction is always placed in the program immediately following the point where the condition upon which the computer is to branch might occur.

A comparison circuit 38 compares the conditions specified by the variant (V) contained in register 27 with the conditions sensed by the central control 18 and provides a continuous control signal to the input circuit 11*a* of the timing generator 11 provided the central control 18 indicates that the condition is met or has occurred.

The central control 18 applies a fetch signal to the timing generator 20 whenever an instruction has been executed and the next instruction is to be fetched for execution. As indicated hereinabove, the gating and timing generator 11 of FIG. 1 is provided merely for execution of a conditional branch instruction. The central control 18 contains the gating, timing, etc., necessary for execution of other conventional computer instructions including the unconditional branch instruction. See the discussion in chapter 2 of the above-referenced book entitled "Digital Computer Fundamentals" for a good general description of the purpose and arrangement of central control and conditional and unconditional branch instructions. The central control 18 is responsive to control pulses at the output circuits *t*3 and *t*8 for forming a fetch pulse in order to obtain the next instruction for execution following the branch instruction.

The timing generator 20 is a conventional electronic circuit for applying a read pulse to "and" gates 21 and 25 followed by a store signal to the gates 26*a* through 30*a*.

The "and" gate 21 is responsive to either a store signal from the timing generator 20 or a timing pulse at the *t*6 output circuit for applying a control pulse to the memory timing generator 16 causing it to form read, write and strobe pulses.

Table II is a table which illustrates the operation performed during each of the control pulses from the timing generator 11 and should be referred to in the following discussion of operation.

*Table II*

| Pulse of Timing Generator **11**: | Operation |
|---|---|
| 1 | Fetch Instruction. |
| 2 | Count I.A.R. |
| 3 | Terminate Instruction. |
| 4 | |
| 5 | Add N to I.A.R. |
| 6 | Write I.A.R in B#X ADDRESS. |
| 7 | Trans. B#1 ADDRESS→C.A.R. |
| 8 | Terminate Instruction. |

Refer now to the operation of the computer system of FIG. 1. Assume initially that all of the registers except the instruction address register 24 are empty. Also assume that the instruction address register 24 contains the address of a branch instruction. Assume now that the central control unit 18 applies a fetch signal to the timing generator 20. The timing generator 20 applies a read signal to the "or" gate 21 causing it to initiate a read operation by the memory timing generator 16. The memory timing generator 16 applies read, write and strobe pulses to the memory unit 10 and buffer register 10*a*, as described hereinbefore, for reading an instruction out of the memory unit 10 and storing it into the buffer register 10*a*. The read pulse formed by the timing generator 20 is also applied to the gate 25 causing the instruction address contained in the instruction address register 24 to be applied to the address input of the memory unit 10. Thus, the branch instruction contained in the memory location identified by the instruction address register 24 is read out of the memory unit 10 and stored into the buffer register 10*a*. Subsequently, the timing generator 20 applies a store signal to the gates 26*a* through 30*a*, causing the gates to store the branch instruction, contained in the buffer register 10$a$, into the corresponding registers 26 through 30.

Assume now that the registers 26 through 30 contain the branch instruction and that the variant portion of the instruction stored in register 28 specifies that the instruction is conditional and that the branch is to occur on one of the conditions noted hereinbefore. Also assume that the modifier (N) contained in register 26 is not equal to zero, and that the compare circuit 38 detects that the condition specified by the variant (V) has occurred. The decoder 31 applies a control signal to the timing generator 11 causing it to start providing pulses at output circuits in the following order: $t1$, $t4$, $t5$, $t6$, $t7$, $t8$ (see Table I). During the pulses at $t1$ and $t4$ nothing of significance occurs in the computer system.

The adder circuit 34 continuously combines the instruction address contained in the instruction address register 24 with the modifier (N) contained in the register 26 and forms an output signal corresponding to the sum thereof. The control pulse applied at the $t5$ output circuit of the timing generator 11 causes the gate 24$b$ to store the output signal of the adder circuit 34 into the instruction address register 24. Thus, following the control pulse at $t5$, the instruction address register 24 contains a modified instruction address (return address) which is equal to the address of the instruction to which the computer will return after executing the branch routine instructions.

The control pulse at the $t6$ output circuit causes the "or" gate 21 to initiate another memory timing cycle by the memory timing generator 16. The control pulse at the $t6$ output circuit also causes the gate 32 to apply the return address contained in register 29 to the address input of the memory unit 10. The gate circuit 22 is responsive to the control pulse at the $t6$ output circuit for storing the return address contained in the instruction address register 24 into the R. ADDRESS position of the information register 10$a$. The unconditional branch instruction is read out of the memory unit 10 and stored into the memory buffer register 10$a$ during the stroke pulse formed by the memory timing generator 16.

However, as described hereinbefore, since a control pulse is applied at the $t6$ output circuit of the timing generator 11, the R. ADDRESS portion of the unconditional branch instruction is not stored into the buffer register 10$a$. Thus, at the following strobe pulse, the buffer register 10$a$ contains the unconditional branch instruction, previously contained in the memory unit 10; however, the return address is now in the R. ADDRESS portion of the instruction. Subsequently, the memory timing generator 16 forms a write pulse causing the unconditional branch instruction to be written back into the same memory location of the memory unit 10 from which it was originally read.

The control pulse formed at the $t7$ output circuit causes the gating circuit 24$a$ to store the address of the first instruction of the branch routine into the instruction address register 24.

The control signal at the $t8$ output circuit indicates to the central control 18 that the conditional branch instruction has been completely executed causing the central control 18 to form another fetch signal and cause the first instruction of the branch routine specified by the address contained in the instruction address register 24 to be fetched from the memory unit 10 for execution. The store pulse formed by timing generator 20 causes the gates 26$a$ through 30$a$ to store the instruction into registers 26 through 30 for execution by central control 18.

The preceding description of operation has been given assuming that the compare circuit 38 has formed a control signal indicating that the condition specified by the variant in register 27 has occurred and that the modifier (N) contained in register 26 is not equal to zero.

Assume now that the compare circuit 38 forms a control signal, indicating that the condition specified by the variant (V) contained in register 27 has occurred but that the decoder 36 now forms a control signal indicating that the modifier (N) is equal to zero.

Whenever the modifier (N), contained in a branch instruction, is equal to zero, it indicates that no return address is to be stored in an unconditional branch instruction at the end of the corresponding branch routine. Thus, the timing generator 11 forms timing pulses at its output circuits in the following sequence: $t1$, $t4$, $t7$, $t8$. (See Table I.) It will be noted that control pulses are applied at the same output circuits of the timing generator 11 as for the condition when the modifier (N) was not equal to zero except that control pulses are not applied at the $t5$ and $t6$ output circuits. With reference to Table II, it will be noted that during the control pulses at the $t5$ and $t6$ output circuits, the modifier (N) contained in register 26 is added to the instruction address contained in register 24 and the modified address is written into the B#X ADDRESS of the unconditional branch instruction located at the end of the corresponding branch routine. Thus, for the assumption that the variant (N) is equal to zero, the unconditional branch instruction is left unaltered and the address of the first instruction of the branch routine (B#1 ADDRESS) is taken from the conditional branch instruction, stored in the instruction address register 24 and subsequently used for fetching the corresponding instruction for execution.

Assume now that the conditional branch instruction stored in registers 26 through 30 contains a variant (V) in register 27 specifying a condition which the central control 18 indicates has not occurred. Under this condition, the compare circuit 38 does not apply a control signal at the 11$a$ input circuit of the timing generator 11. Thus, the timing generator 11 forms control pulses at its output circuits in the following sequence: $t1$, $t2$, $t3$ (see Table I). Nothing of significance happens during the pulse at $t1$. The control pulse at the $t2$ output circuit causes the instruction address register 24 to count the address contained therein up one address and thereby form the address of the next instruction in sequence following the branch instruction.

The control pulse at the $t3$ output circuit causes the central control 18 to form another fetch signal and thereby cause the instruction contained in the address specified by the content of the instruction address register 24 to be read out of the memory 10 for execution. Thus, it may now be seen that if the condition specified by the variant has not occurred the digital computer of FIG. 1 goes on to the next sequential instruction.

It should be understood that the present invention is applicable to character oriented computer systems which read and write in the memory character by character as well as word machines such as that described herein. In such an arrangement, the instructions could be composed of characters and the addresses contained in the conditional branch and unconditional branch instructions could be the address of the first character of instructions to be read from memory 10.

The length of the instructions could be marked by a special control bit in the string of instructions in the memory 10. Alternately, the register for storing the instruction addresses could be arranged for counting the content thereof through a number of addresses corresponding to the number of characters in a complete instruction and circuits provided for reading each of the characters specified by the addresses from the memory. It should be noted that the modifier contained in register 26 specifies the amount by which the instruction contained in the instruction address register 24 is to be modified to form the return address. Also, the modifier is equal to the number of instruction addresses which must be added to the conditional branch instruction address to form the return address. Therefore, in the alternate arrangement, the number of characters in each instruction word must be multiplied times the modifier contained in register 26 and the result added to the instruction address contained in the instruction address register 24 in order to form the correct address of the first character of the return address.

What is claimed is:

1. In a digital computer arranged for normally executing a series of sequentially addressable instructions and for branching and thereby changing the normal sequence of instructions under program control, comprising:

(a) memory means for storing a program comprising at least a first series of sequentially addressable instructions including a conditional branch instruction and a second series of sequentially addressable instructions including an unconditional branch instruction at the end thereof, said conditional branch instruction including a modifier portion, and at least two addresses corresponding to the addresses of the first one of said second series of instructions and of the unconditional branch instruction;

(b) means for normally and sequentially forming addresses corresponding to said first series of instructions and for reading such instructions out of the memory means;

(c) means for selectively combining the modifier portion of a conditional branch instruction read out of the memory means with an address formed by the address forming means for forming a return address corresponding to the next instruction to be executed following said second series of instructions;

(d) means for writing the return address into the memory means location which is identified by the unconditional branch instruction address contained in the conditional branch instruction read out of the memory means for forming an instruction for returning the computer to a predetermined instruction in the program after execution of said second series of instructions; and (e) means for fetching from the memory means for execution the first one of said second instructions identified by the first address in the conditional branch instruction read out of the memory means.

2. In a digital computer arranged for normally executing a series of sequentially addressable instructions and for branching and thereby changing such normal sequence of instructions under program control, comprising:

(a) memory means for storing a program comprising at least a first series of sequentially addressable instructions including a conditional branch instruction and a second series of sequentially addressable instructions including an unconditional branch instruction at the end thereof, said conditional branch instruction including a modifier portion, and at least two addresses corresponding to the addresses of the first one of said second series of instructions and of the unconditional branch instruction;

(b) means for normally and sequentially forming addresses corresponding to said first series of instructions and for reading such instructions out of the memory means;

(c) means for selectively combining the modifier portion of a conditional branch instruction read out of the memory means with an address formed by the address forming means for forming a return address corresponding to the next instruction to be executed following said second series of instructions;

(d) means for writing the return address into the memory means location which is identified by the unconditional branch instruction address contained in the conditional branch instruction read out of the memory means and thereby forming an instruction for returning the computer to a predetermined instruction in the program after execution of said second series of instructions; and (e) means for fetching from the memory means for execution the first one of said second instructions identified by the first address in the conditional branch instruction read out of the memory means.

3. In a digital computer arranged for normally executing a series of sequentially addressable instructions and for branching and thereby changing such normal sequence of instructions under program control, comprising:

(a) memory means for storing a program comprising at least a first series of sequentially addressable instructions including a first branch instruction and a second series of sequentially addressable instructions including a second branch instruction, said first branch instruction including a modifier portion, and at least two addresses corresponding to the addresses of the first one of said second series of instructions and of the second branch instruction;

(b) means for normally and sequentially forming addresses corresponding to said first series of instructions and for reading such instructions out of the memory means;

(c) means for storing the instructions read out of the memory means;

(d) means arranged automatically in response to the presence of a branch instruction contained in the storing means for combining the modifier portion of such first branch instruction with an address formed by the address forming means for forming a return address corresponding to the next instruction to be executed following said second series of instructions;

(e) means for writing the return address into the memory means location which is identified by the second branch instruction address contained in the instruction storing means for forming an instruction for returning the computer to a predetermined instruction in the program from said second series of instructions; and (f) means for fetching from the memory means for execution the first one of said second instructions identified by the first address contained in said instruction storing means.

4. In a stored program digital computer, comprising:

(a) memory means for storing a computer program including a branch instruction having at least a modifier portion, and the addresses corresponding to a return from branch instruction;

(b) means for normally and sequentially forming addresses corresponding to instructions and for reading such instructions out of the memory means;

(c) means for selectively combining the modifier portion of a branch instruction read out of the memory means with an address formed by the address forming means for forming a return from branch address; and (d) means for writing the return from branch address into the memory means location identified by the return from branch instruction address contained in the stored branch instruction for thereby forming an instruction for returning the computer to a predetermined instruction in the program after the branch.

5. In a stored program digital computer, comprising:

(a) memory means for storing a computer program including a branch instruction having at least a modifier portion, and the address corresponding to a return from branch instruction;

(b) means for normally and sequentially forming addresses corresponding to instructions and for reading such instructions out of the memory means;

(c) register means for storing the instructions read out of the memory means;

(d) means for automatically combining the modifier portion of a branch instruction stored in the register means with an address formed by the address forming means for forming a return from branch address; and (e) means for writing the return from branch address into the return from branch instruction identified by the stored branch instruction for thereby forming an instruction for returning the computer to a predetermined instruction in the program after the branch.

6. In a stored program digital computer, comprising:

(a) a memory device for storing a computer program including a branch instruction having at least a modifier portion, and the address corresponding to a return from branch instruction;

(b) means for normally and sequentially forming addresses corresponding to instructions and for reading such instructions out of the memory device;

(c) register means for storing the instructions read out of the memory device;

(d) a timing generator arranged for forming a series of timing signals in response to the storage of a branch instruction in the register means;

(e) means including an adding circuit under control of timing signals from the timing generator for combining the modifier portion of the branch instruction stored in the register means with an address formed by the address forming means for forming a return from branch address; and (f) means for writing the return from branch address into the return from branch instruction identified by the stored branch instruction for forming an instruction for returning the computer to a predetermined instruction in the program after the branch.

7. In a stored program computer, including:

(a) a memory device for storing a computer program including a branch command having at least a modifier portion and the address corresponding to a return from branch instruction following a branch routine;

(b) means for forming the addresses of sequential memory locations containing instructions and including means for fetching such instructions out of the memory device;

(c) means for storing the instructions fetched from the memory device;

(d) computer control means including an electrical circuit for detecting a branch instruction stored in the storing means and arranged in response thereto for forming a first control signal if the modifier portion of such branch instruction has a value of zero and for forming a second control signal followed by a third control signal if the modifier portion thereof has a value other than zero; and (e) means responsive to said second control signal for combining the modifier portion of the stored branch instruction and an address formed by the address forming means for forming a return from branch address and for writing such address into the return from branch instruction identified by the stored branch instruction, said instruction fetching means being arranged in response to said first and third control signals for automatically fetching the first one of the branch routine instructions corresponding to the stored branch instruction which is to be executed following the branch instruction.

8. In a stored program computer, including:

(a) a memory device for storing a computer program including a branch command having at least a modifier portion and the address corresponding to a return from branch instruction following a branch routine;

(b) means for forming the addresses of sequential memory locations containing instructions and including means for fetching such instructions out of the memory device;

(c) means for storing the instructions fetched from the memory device;

(d) computer control means including an electrical circuit for detecting a branch instruction stored in the storing means and arranged in response thereto for automatically independently of program forming a first control signal if the modifier portion of such branch instruction has a value of zero and for forming a second control signal followed by a third control signal if the modifier portion thereof has a value other than zero; and (e) means responsive to said second control signal for automatically independently of program combining the modifier portion of the stored branch instruction and an address formed by the address forming means and for forming a return from branch address and for writing such address into the return from branch instruction identified by the stored branch instruction, said instruction fetching means being arranged in response to said first and third control signals for automatically fetching the first one of the branch routine instructions corresponding to the stored branch instruction, which is to be executed following the branch instruction.

9. In a stored program computer, including:

(a) a memory device for storing a computer program including a branch command having at least a modifier portion and the address corresponding to a return from branch instruction;

(b) means for forming the addresses corresponding to sequential memory locations containing instructions and fetching such instructions out of the memory device;

(c) means for storing the instructions fetched from the memory device;

(d) an electrical timing unit for forming an electrical timing signal in response to the presence of a branch command in the instruction storing means;

(e) means arranged in response to the electrical signal for combining the modifier portion of the stored branch instruction and an address formed by the address forming means for forming a return from branch address; and (f) means for writing the return from branch address into the return from branch instruction identified by the stored branch instruction.

10. In a stored program computer, including:

(a) a memory device for storing a computer program including a branch command having at least a modifier portion and the address corresponding to a return from branch instruction;

(b) means for forming the addresses corresponding to sequential memory locations containing instructions and fetching such instructions out of the memory device;

(c) means for storing the instructions fetched from the memory device;

(d) an electrical timing unit for forming an electrical timing signal in response to the presence of a branch command in the instruction storing means;

(e) means for automatically independently of program combining the modifier portion of the stored branch instruction with an address formed by the fetching means and thereby forming a return from branch address; and (f) means for writing the return from branch address into the return from branch instruction identified by the stored branch instruction.

11. In a digital computer for executing a branch instruction placed in a program of instructions arranged and stored in sequentially addressable memory locations of a memory unit, comprising:

(a) means for forming addresses identifying sequentially addressable memory locations of a memory unit containing instructions including a branch instruction having at least a modifier portion, an address identifying the first instruction of a branch routine and an address identifying a return from branch routine instruction;

(b) means for reading the addressed instructions out of such memory unit including such branch instruction;

(c) means for detecting a branch instruction read out of such memory unit;

(d) means automatically in response to the electrical detection of a branch instruction for combining the modifier portion of a detected branch instruction with an instruction address to form an address identifying an instruction to be executed following the branch routine;

(e) means automatically in response to the detection of a branch instruction for writing the instruction address formed by the last mentioned means into the return from branch routine instruction identified by the detected branch instruction; and (f) means for reading the first branch routine instruction identified by the detected branch instruction out of such memory unit for execution by the digital computer.

12. In a digital computer arranged for forming an address for use in a return from branch routine instruction wherein program instructions are arranged in order and stored in sequentially addressable memory locations of a memory unit and include a branch instruction having a modifier portion and an address corresponding to a return from branch routine instruction, comprising:

(a) means for forming addresses identifying instructions of a stored program in a memory unit including a branch instruction;

(b) means for reading the instructions designated by the formed addresses out of such memory unit;

(c) means for combining one of the instruction addresses with the modifier portion of a branch instruction read out of such memory unit for forming the address of an instruction for execution following the execution of such branch routine; and (d) means for writing the address formed by the combining means into the return from branch routine instruction identified by such branch instruction for forming a complete return from branch routine instruction for control of the digital computer.

References Cited by the Examiner

UNITED STATES PATENTS 3,058,659 10/1962 Demmer et al. ----- 340—172.5

ROBERT C. BAILEY, *Primary Examiner.*

P. L. BERGER, *Assistant Examiner.*